3,151,022
O,O-DIMETHYL-O-(4-METHYLMERCAPTOPHENYL) PHOSPHATE AND PESTICIDAL USE

Everett E. Gilbert, Morris Township, Morris County, and Julian A. Otto, Stockholm, N.J., assignors to Allied Chemical Corporation, New York, N.Y., a corporation of New York
No Drawing. Filed Mar. 8, 1962, Ser. No. 178,242
3 Claims. (Cl. 167—30)

This invention relates to the production of a new organic phosphate useful as an active pesticidal toxicant.

Accordingly, one object of the invention is to provide a new chemical compound in the form of an organic phosphate. Another object is the provision of a novel organic phosphate for application as a pesticide. Other objects and advantages of the invention will be apparent hereinafter.

The novel organic phosphate of the invention is O,O-dimethyl-O-(4-methylmercaptophenyl) phosphate, which may be represented by the following formula:

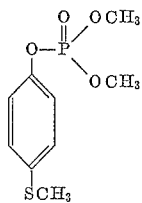

O,O-dimethyl-O-(4-methylmercaptophenyl) phosphate may be prepared by reacting 4-methylmercaptophenol with dimethyl chlorophosphate in the presence of a basic material, such as potassium carbonate, triethylamine and pyridine. If desired, a catalyst such as copper may be used in order to accelerate the reaction. The reaction is preferably carried out in an inert organic solvent, such as benzene, toluene, xylene and acetone.

The preparation of O,O-dimethyl-O-(4-methylmercaptophenyl) phosphate using potassium carbonate as the basic material may be represented by the following equation:

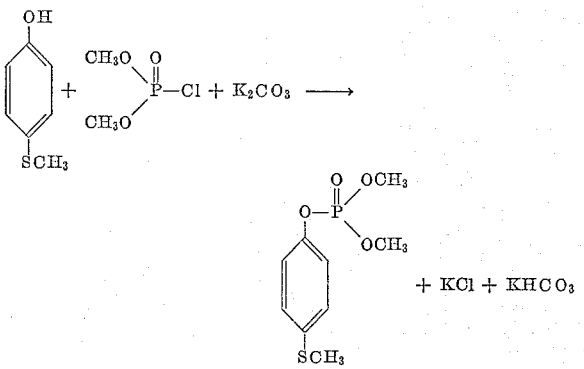

The organic phosphate of this invention is a liquid which is insoluble in water but soluble in benzene, toluene, xylene, acetone and alcohol.

The following example, in which parts are by weight, is given for the purpose of illustrating a typical method of producing the organic phosphate.

EXAMPLE 1

14 parts of 4-methylmercaptophenol and 50 parts of benzene were placed in a reaction vessel. To this solution were added 14 parts of potassium carbonate and about 0.3 part of powdered copper. The resulting mixture was heated to temperature of 50–60° C., and 144.5 parts of dimethyl chlorophosphate were slowly added with stirring. The mixture was then heated at reflux with continued stirring for about 3½ hours. After this period, the mixture was filtered and the precipitate washed with benzene and then with acetone. Residual solvent was stripped off at reduced pressure, and a liquid residue of 22.5 parts of O,O-dimethyl-O-(4-methylmercaptophenyl) phosphate, corresponding to a yield of about 65% of theory, was obtained.

The liquid product analyzed as follows:

|  | Found | Calculated |
|---|---|---|
| Percent sulfur | 12.3 | 12.9 |
| Percent phosphorus | 11.4 | 12.5 |

Infrared spectrographic analysis of the product showed peaks at 3.4 microns (indicative of the carbon-hydrogen linkage), 6.1, 6.3 and 12.1 microns (indicative of the phenyl group), 6.7 and 6.82 microns (indicative of the methyl group), 8.2 microns (indicative of the phosphorus-oxygen-phenyl moiety), 9.35, 9.55 and 11.67 microns (indicative of the $$-\overset{O}{\underset{\|}{P}}(OCH_3)_2$$

group) and 13.2 microns (indicative of divalent sulfur).

The organic phosphate of this invention is ordinarily applied as toxicant for combatting insects and mites, in conjunction with a carrier which may be a solid, liquid or gaseous material.

When employed in the form of a powder or dust for killing insects and mites, the toxicant may be mixed with a substantial proportion of any suitable inert material or diluent, preferably in finely divided form, such as known grades of prepared parasiticide carrier clays, pyrophyllite, fuller's earth, bentonite, sulfur, lime, talc, whiting, diatomaceous earth, etc. Suitable dusts of this type usually contain not less than 0.1% and preferably not less than 1.0% by weight of toxicant.

Liquid insecticide or miticide sprays containing the toxicant may be prepared by first forming a solution of the compound in a suitable organic solvent, e.g., xylene, petroleum hydrocarbons of high aromatic content, alcohols, esters, ketones, etc., and preferably adding a small amount of wetting or emulsifying agent commonly employed in the art, such as diglycol oleate or p-isooctyl phenyl ether of polyethylene glycol. The resulting concentrate solution is incorporated with water in quantity sufficient to form an aqueous spray dispersion or emulsion having the desired active ingredient concentration.

In a preferred embodiment, aqueous spray dispersions or suspensions may be formed by incorporating in water so-called dry wettable spray powders or water dispersible pastes containing the organic phosphate of the invention. These mixtures may also include inert diluents, suitable quantities of wetting, dispersing and suspending agents and, if desired, secondary toxicants.

The aqueous spray dispersions of the invention preferably should contain the toxicant in an amount not less than 1/64 pound per 100 gallons of spray, the more usual concentrations being in the range of 1/16 to 1/2 pound per 100 gallons of spray.

The organic phosphate of this invention is not only effective for killing insects, such as those which invade plants, when applied in the usual manner, i.e., directly to the insects or to the portions of the host plants they infest, but is also extremely effective when used as a systemic toxicant. In such case, the toxicant, with or without a suitable carrier or diluent, can be applied to the soil in the vicinity of the growing plant to be protected, the toxicant being absorbed from the soil by the plant. Alternatively, the toxicant can be applied directly to portions of the plant where it is again absorbed and distributed throughout the plant tissues, including portions not directly treated. In either case, the whole plant then becomes toxic to insects which feed on it.

Following Table I shows the results of tests relating to topical application to insects and mites of the organic phosphate of the present invention as compared to the most closely related prior art organic phosphates, i.e., O,O-diethyl-O-(4-methylmercaptophenyl) phosphate and O,O-dimethyl-O-(4-methylmercaptophenyl) thionophosphate. In the table, the phosphate of this invention is designated as 1 and the prior art compounds as 2 and 3, respectively.

Table I

| Organic Phosphate | Formulation | Southern Armyworms (percent Kill) | Houseflies (percent Kill) | Mites (percent Kill) |
|---|---|---|---|---|
| 1 | 1/16 lb. organic phosphate composition a per 100 gallons water. | 93.3 | | |
| 2 | ----do---- | 0 | | |
| 3 | ----do---- | 40 | | |
| 1 | 1/32 pint organic phosphate composition b per 100 gallons water. | 93.3 | | |
| 2 | ----do---- | 0 | | |
| 3 | ----do---- | 66.7 | | |
| 1 | 1 part by volume organic phosphate composition c per 10,239 parts by volume sugar solution (20 lbs. sugar dissolved in water to 100 gallons). | | 93.5 | |
| 2 | ----do---- | | 30.7 | |
| 3 | ----do---- | | 4.2 | |
| 1 | 1/16 lb. organic phosphate composition a per 100 gallons water. | | | 95.8 |
| 2 | 1/8 lb. organic phosphate composition a per 100 gallons water. | | | 23.0 |
| 3 | 1/16 lb. organic phosphate composition a per 100 gallons water. | | | 33.3 |
| 1 | 1/32 pint organic phosphate composition b per 100 gallons water. | | | 98.3 |
| 2 | 1/16 pint organic phosphate composition b per 100 gallons water. | | | 2.4 |
| 3 | 1/32 pint organic phosphate composition b per 100 gallons water. | | | 39.4 | a Organic phosphate compositions in the form of 25% wettable powders comprising 25% organic phosphate, 73% Attaclay (fuller's earth) and 2% Polyfon F (a dispersing agent comprising a sodium lignosulfonate).

b Organic phosphate compositions in the form of 50% emulsifiable concentrates comprising 50% organic phosphate, 44.8% xylene, 2.6% Triton X-151 and 2.6% Triton X-171 (emulsifying agents comprising blends of alkyl aryl polyether alcohols and organic sulfonates).

c 4.8 grams of organic phosphate dissolved in acetone to 100 cc.

The tests on toxicity to southern armyworms (*Prodenia eridania*) were carried out by spraying horticultural (cranberry) bean plants with the indicated formulation and allowing the plants to dry. Armyworm larvae were confined to the treated foliage by means of wire cages. Mortality count was made four days after treatment.

The tests on toxicity to houseflies (*Musca domestica*) were carried out by pipetting 0.5 cc. of the indicated formulation onto glass plates and allowing it to dry. The flies were confined over the plates by means of screen wire hemispheres. After one hour exposure to the bait, moisture and food were provided in the form of balls of "Cellucotton" (an absorbent cellulose composition resembling cotton) soaked in water-sugar solution. Percent kill was recorded 24 hours after confinement.

The tests on toxicity to mites were carried out on two-spotted mites (*Tetranycus telarius*) by spraying the indicated formulation onto horticultural (cranberry) bean plants infested with the mites. Following treatment, the plants were stored on racks in irrigated trays under greenhouse conditions. Mortality counts were made three days after treatment.

Following Table II illustrates comparative systemic insecticide activity of the organic phosphate of this invention and the most closely related prior art organic phosphates described above.

Table II

| Organic Phosphate | Formulation | Southern Armyworms (Percent Kill) | Greenhouse White Flies (Percent Kill) |
|---|---|---|---|
| 1 | Organic phosphate composition a | 100 | |
| 2 | ----do---- | 0 | |
| 3 | ----do---- | 35.3 | |
| 1 | 1 part by volume organic phosphate composition a per 159 parts by volume water. | | 100 |
| 2 | ----do---- | | 12.5 |
| 3 | ----do---- | | 77.4 | a 4.8 grams of organic phosphate dissolved in acetone to 100 cc.

The tests on toxicity to southern armyworms were carried out by pipetting a sufficient amount of the indicated formulation onto the stems of 2-leaf stage horticultural (cranberry) bean plants one inch above the soil level to provide 0.03 mg. of organic phosphate per plant and infesting the plants the same day with eleven-day old armyworm larvae. Percent kill was recorded three days after treatment.

The tests on toxicity to greenhouse white flies were carried out by heavily infesting potato vine terminals with eggs of the flies, cutting the terminals and placing the cut ends in the indicated formulation for 1½ hours. The terminals were then put with their cut ends in tumblers containing fresh tap water and placed on a greenhouse shelf until crawler mortality counts were made seven days later.

As shown by the above data, the organic phosphate of the present invention shows unexpectedly increased insecticidal and miticidal activity as compared to the most closely related prior art organic phosphates.

While the preferred embodiments for carrying out the present invention have been described, it will be apparent that many changes may be made therein without departing from the spirit of the invention.

We claim:

1. O,O-dimethyl-O-(4-methylmercaptophenyl) phosphate.

2. Insecticidal and miticidal compositions comprising O,O-dimethyl-O-(4-methylmercaptophenyl) phosphate in toxic quantity, together with a carrier therefor.

3. The method of combatting pests including insects and mites which comprises subjecting said pests to the action of a toxic quantity of O,O-dimethyl-O-(4-methylmercaptophenyl) phosphate.

References Cited in the file of this patent
UNITED STATES PATENTS

| | | |
|---|---|---|
| 2,758,954 | Tidwell | Aug. 14, 1956 |
| 2,795,598 | Scherer et al. | June 11, 1957 |
| 2,803,580 | Metivier | Aug. 20, 1957 |
| 3,042,703 | Schegk et al. | July 3, 1962 |

FOREIGN PATENTS

| | | |
|---|---|---|
| 263,880 | Switzerland | Dec. 16, 1949 |
| 1,089,376 | Germany | Sept. 22, 1960 |

OTHER REFERENCES

Fukuto et al.: "J. Agr. Food Chem.," vol. 4, pp. 930–935 (1956).